United States Patent
Gummalla et al.

(10) Patent No.: US 7,489,644 B2
(45) Date of Patent: Feb. 10, 2009

(54) VOICE ARCHITECTURE FOR TRANSMISSION OVER A SHARED, CONTENTION BASED MEDIUM

(75) Inventors: Ajay Chandra V. Gummalla, Atlanta, GA (US); Dolors Sala, Atlanta, GA (US)

(73) Assignee: Broadcom Corporation, Irvine, CA (US)

(*) Notice: Subject to any disclaimer, the term of this patent is extended or adjusted under 35 U.S.C. 154(b) by 665 days.

(21) Appl. No.: 11/248,163

(22) Filed: Oct. 13, 2005

(65) Prior Publication Data

US 2006/0039363 A1 Feb. 23, 2006

Related U.S. Application Data

(63) Continuation of application No. 09/785,020, filed on Feb. 15, 2001, now Pat. No. 7,203,164, and a continuation-in-part of application No. 09/427,792, filed on Oct. 27, 1999, now Pat. No. 6,804,251.

(60) Provisional application No. 60/262,201, filed on Jan. 17, 2001, provisional application No. 60/262,203, filed on Jan. 17, 2001, provisional application No. 60/254,415, filed on Dec. 8, 2000, provisional application No. 60/247,188, filed on Nov. 9, 2000, provisional application No. 60/182,470, filed on Feb. 15, 2000.

(51) Int. Cl.
*G08C 15/00* (2006.01)
(52) U.S. Cl. ....................... 370/252; 370/412
(58) Field of Classification Search ......... 370/412–419, 370/395.4, 395.2, 252
See application file for complete search history.

(56) References Cited

U.S. PATENT DOCUMENTS 5,631,908 A 5/1997 Saxe (Continued)

FOREIGN PATENT DOCUMENTS

EP 0 774 848 A2 5/1997

(Continued)

OTHER PUBLICATIONS

Limb, J. and Sala, D., "An Access Protocol to Support Multimedia Traffic over Hybrid Fiber/Coax Systems," Proceedings of the International Workshop on Community Networking Integrated Multimedia Services to the Home, Jun. 20, 1995, pp. 35-40.

(Continued)

*Primary Examiner*—Kwang B. Yao
*Assistant Examiner*—Kenan Cehic
(74) *Attorney, Agent, or Firm*—Sterne, Kessler, Goldstein & Fox, P.L.L.C.

(57) ABSTRACT

A control terminal such as a CMTS is initialized to receive packets of voice calls having parameters including a bit rate, a packetization interval, and a call identification. A plurality of queues is created to define a corresponding plurality of phases at a sub-multiple of the packetization interval. Voice calls are admitted to the control terminal. The voice calls are distributed among the queues in a predetermined order as the voice calls are admitted and the voice calls removed from the queues as the voice calls are terminated. USGs are periodically issued at the phases defined by the queues. The USGs include a call identification and a grant of bandwidth sufficient to transmit the packets.

14 Claims, 21 Drawing Sheets

U.S. PATENT DOCUMENTS

| | | | |
|---|---|---|---|
| 5,850,400 | A | 12/1998 | Eames et al. |
| 5,926,478 | A * | 7/1999 | Ghaibeh et al. ........ 370/395.51 |
| 6,442,158 | B1 | 8/2002 | Beser |
| 6,504,838 | B1 * | 1/2003 | Kwan .......................... 370/352 |
| 6,535,521 | B1 | 3/2003 | Barghouti et al. |
| 6,546,017 | B1 | 4/2003 | Khaunte |
| 6,563,792 | B1 * | 5/2003 | Chang et al. ............. 370/235.1 |
| 6,580,721 | B1 | 6/2003 | Beshai |
| 6,621,812 | B1 | 9/2003 | Chapman et al. |
| 6,728,584 | B1 * | 4/2004 | Duan et al. .................... 700/94 |
| 7,006,435 | B1 * | 2/2006 | Davies et al. ................ 370/230 |
| 2008/0037618 | A1 * | 2/2008 | LeBlanc et al. ............. 375/222 |

FOREIGN PATENT DOCUMENTS

| | | |
|---|---|---|
| EP | 0 829 986 A1 | 3/1998 |
| EP | 0 844 803 A2 | 5/1998 |
| EP | 0 912 016 A2 | 4/1999 |
| WO | WO 99/18718 | 4/1999 |
| WO | WO 99/30449 | 6/1999 |

OTHER PUBLICATIONS

Sala, D. et al., "Adaptive Control Mechanism for Cable Modem MAC Protocols," Proceedings of the IEEE Infocom, IEEE, vol. 3, Mar. 29, 1998, pp. 1392-1399.

International Search Report for Appl. No. PCT/US01/04841, issued Nov. 8, 2001, 5 pages.

International Search Report for Appl. No. PCT/US01/04819, issued Sep. 28, 2001, 7 pages.

International Search Report for Appl. No. PCT/US01/04820, issued Sep. 27, 2001, 8 pages.

"Data-Over-Cable Service Interface Specifications," Cable Television Laboratories, Inc., http://www.tcon1.com/{jkleens/DOCSIS.pdf, Copyright 1999, 18 pages.

International Search Report For Appl. No. PCT/US01/04904 issued Nov. 8, 2001, 4 pages.

* cited by examiner

CALL 1: CM1, VID0:  5ms, 16 Kbps=2 MS (1:0)
CALL 2: CM2, VID0: 10ms, 32 Kbps=4 MS (2:0)
CALL 3: CM3, VID0: 20ms, 32 Kbps=7 MS (3:0)
CALL 4: CM4, VID0: 20ms, 32 Kbps=7 MS (4:0)
CALL 5: CM1, VID1: 10ms, 16 Kbps=3 MS (1:1)
CALL 6: CM2, VID1: 10ms, 16 Kbps=3 MS (2:1)

FIG.5C

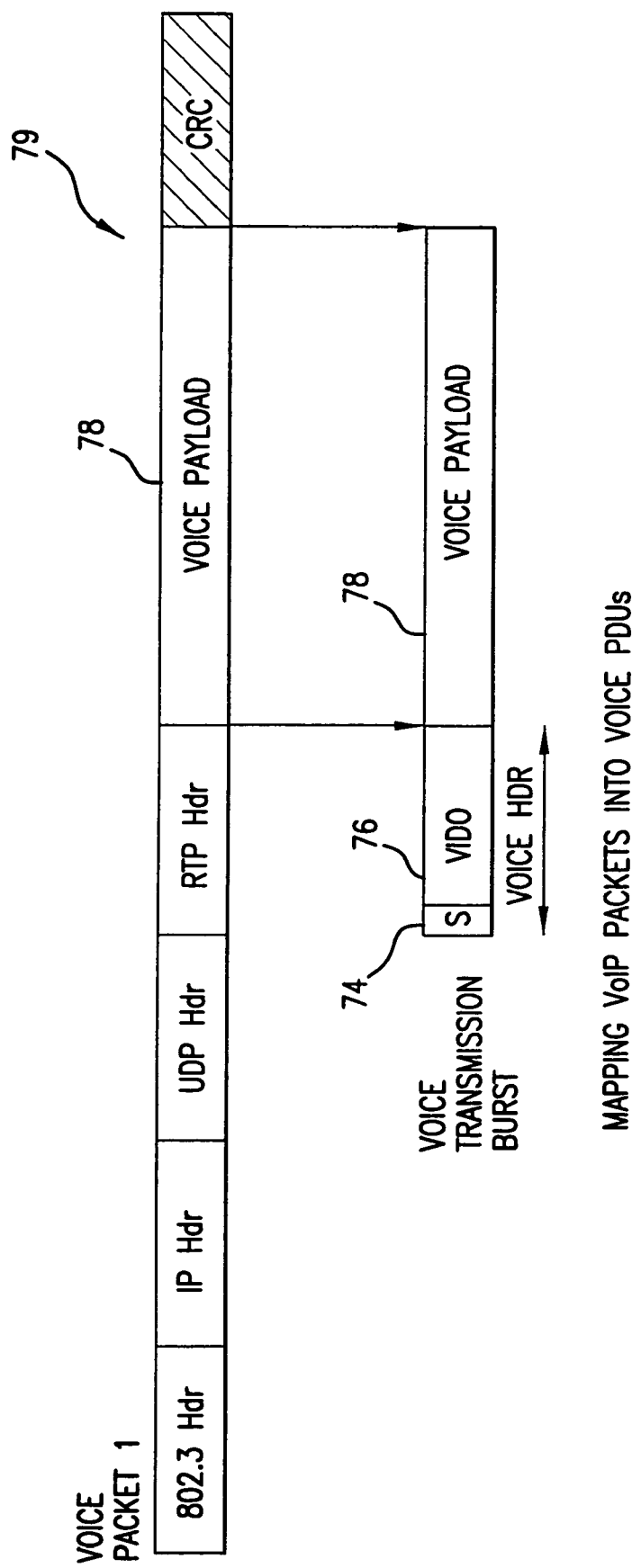
FIG.6A MAPPING VoIP PACKETS INTO VOICE PDUs

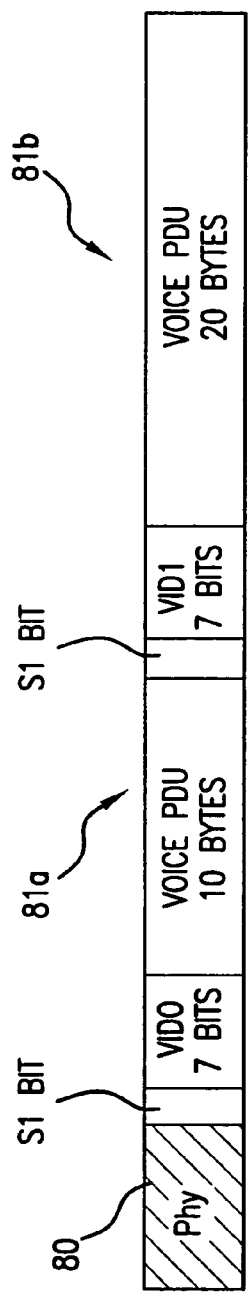
FIG.6B CONCATENATION OF TWO VOICE CHANNELS OF DIFFERENT RATES
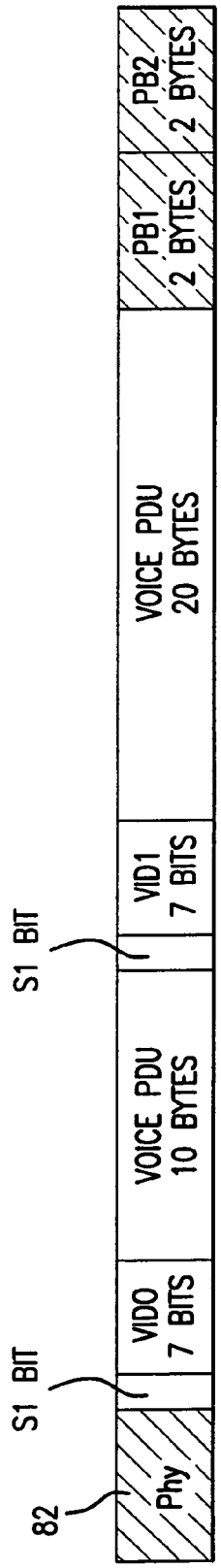
FIG.6C CONCATENATION OF VOICE CHANNELS AND PIGGYBACKING REQUESTS

CALL ADMISSION: UNBALANCED

| 2:1 3 MS | 1:1 3 MS | 2:0 4 MS | 1:0 2 MS |
|---|---|---|---|

| 3:0 7 MS | 1:0 2 MS |
|---|---|

| 2:1 3 MS | 1:1 3 MS | 2:0 4 MS | 1:0 2 MS |
|---|---|---|---|

| 4:0 7 MS | 1:0 2 MS |
|---|---|

CALL ADMISSION: BALANCED

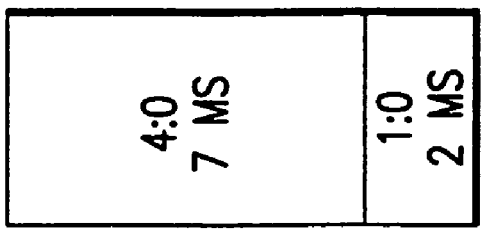
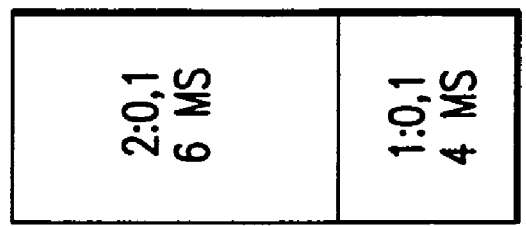
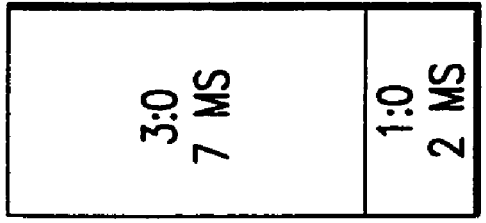
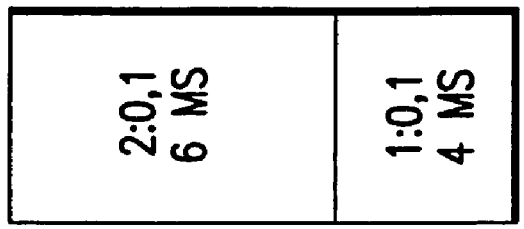
CALL ADMISSION: BALANCED WITH CONCATENATION
FIG.11

CALL ADMISSION: BALANCED AND DISTRIBUTED CM ALLOCATION

VOICE ARCHITECTURE FOR TRANSMISSION OVER A SHARED, CONTENTION BASED MEDIUM

CROSS-REFERENCE TO RELATED APPLICATION(S)

This application is a continuation of application Ser. No. 09/785,020, filed on Feb. 15, 2001, which claims priority to the following provisional patent applications: Application No. 60/182,470, filed on Feb. 15, 2000; Application No. 60/247,188, filed on Nov. 9, 2000; Application No. 60/254,415, filed on Dec. 8, 2000; Application No. 60/262,203, filed on Jan. 17, 2001; Application No. 60/262,201, filed on Jan. 17, 2001. Application No. 09/785,020 is also a continuation-in-part of non-provisional application Ser. No. 09/427,792, filed on Oct. 27, 1999, now U.S. Pat. No. 6,804,251. The disclosures of these applications are incorporated herein fully by reference.

BACKGROUND OF THE INVENTION

This invention relates to a voice architecture for transmission over a shared, contention based medium, and more particularly, to transmission of multiple voice calls on such a medium.

Traditionally voice is supported in telephone networks as a circuit switched service with a dedicated slot assignment. As a result, resources are dedicated for the entire duration of the call, which results in under-utilization of the bandwidth. However, a such service results in little jitter and minimal delay.

More recently, voice is being supported over internet protocol (IP), shipped as IP frames over data networks. This results in higher utilization of bandwidth at the cost of delay and jitter. There are many standards that digitize analog voice in trade offs of efficiency, bandwidth, processing power, and voice quality. Voice quality manifests itself in low jitter and small delay. Users of voice transmission facilities pay according to the Quality of Service (QoS).

SUMMARY OF THE INVENTION

According to the invention, voice calls that occur at a packetization interval are divided into phases within the packetization interval for call management. This limits or "bounds" the jitter that inherently occurs transmission of packetized voice to the phase interval, instead of the packetization interval. Specifically, a control terminal such as a cable modem termination system or a telephone central office is initialized to receive packets of voice calls having parameters including a bit rate, a packetization interval, and a call identification. A plurality of queues is created to define a corresponding plurality of phases at a sub-multiple of the packetization interval. Voice calls are admitted to the control terminal. The voice calls are distributed among the queues in a predetermined order as the voice calls are admitted and the voice calls removed from the queues as the voice calls are terminated. In a cable transmission system, unsolicited grants (USGs) are periodically issued at the phases defined by the queues. The USGs include a call identification and a grant of bandwidth sufficient to transmit the packets.

DESCRIPTION OF THE DRAWINGS

The features of specific embodiments of the best mode contemplated of carrying out the invention are illustrated in the drawings, in which:

FIG. 5C is a table that represents the parameters of a number of voice calls for purposes of illustrating the operation of the invention;

FIGS. 6A to 6C are diagrams that represent voice data formats used in practicing the invention;

FIGS. 9 to 12 are diagrams that represent voice queues that are filled in different ways;

DETAILED DESCRIPTION OF SPECIFIC EMBODIMENTS

Figure 1:
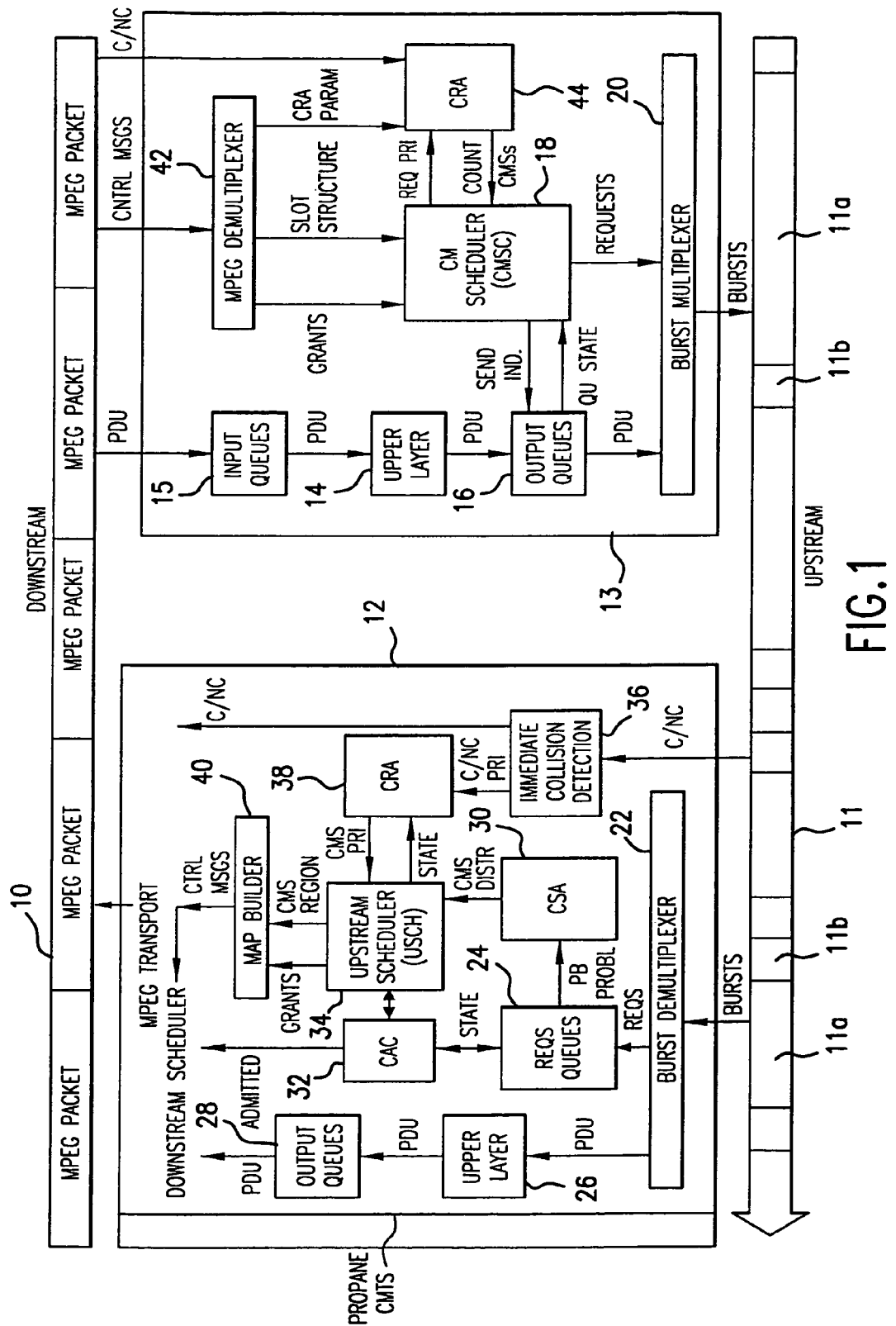
FIG. 1 is a schematic block diagram of a cable transmission system incorporating principles of the invention.

FIG. 1 illustrates a cable transmission system architecture that embodies principles of the invention. A number of downstream channels such as a channel 10 and a number of upstream channels such as a channel 11 are connected between a headend at which a cable modem termination system (CMTS) 12 is located and a plurality of cable modems (CMs) such a cable modem 13. Application Ser. No. 09/430,821 filed on Oct. 29, 1999, the disclosure of which is incorporated fully herein by reference, describes a cable transmission system in which the invention can be implemented. As represented, downstream channel 10 carries information, such as television signals, IP data and control messages in MPEG packets and upstream channel 11 continuously from CMTS 12 to each of CM and upstream channel 11 carries bursts of data in minislots (MS) from a CM to CMTS 12. The upstream data includes data in assigned minislots 11a to be transmitted external to the system and data in contention minislots 11b to be used internally to request assignment of minislots 11a.

In CM 13, a block 14 represents an upper layer such as a web browser or other source of data to be transmitted. The data is fed to block 14 from input queues 15, which store the received data to be transmitted upstream until it is processed by CM 13. Packet data units (PDUs) from upper layer 14 are coupled to output queues 16. Output queues 16 send to a cable modem scheduler (CMSC) 18 an indication of the queue state so CMSC 18 can piggyback a request in a region of data minislots 11a. CMSC 18 sends requests for minislots to a burst multiplexer 20, which forms the physical layer interface between CM 13 and upstream channel 11. CMSC 18 also transmits send indications to output queues 16 to transfer PDUs to burst multiplexer 20 at the appropriate time to fill the assigned time slots. Responsive to the requests from CMSC 18, burst multiplexer 20 sends requests for minislots to burst multiplexer 20 for transmission in contention minislots 11b and PDUs to burst multiplexer 20 for transmission in minislots 11a assigned as described below by grants from CMTS 12.

In CMTS 12, bursts of data are coupled from upstream channel 11 to a burst demodulator 22, which forms the physical layer interface between CMTS 12 and upstream channel 11. Burst demodulator 22 directs requests for minislots to a request queue 24 and PDUs to a block 26, which represents an upper layer such as a web browser or other data receiver. PDUs from upper layer 26 are sent to output queues 28 for external use. A contention slot allocator (CSA) 30 specifies which time slots are in the upstream channel are to be used as assigned data minislots 11a and contention minislots 11b. If there are no requests in queue 24, contention minislots 11b are assigned. The piggyback (PB) probability is sent from request queue 24 to CSA 30 to help CSA 30 determine the breakdown of upstream bandwidth into data minislots 11a and contention minislots 11b. The state of queues 24 is sent to call admission contoller (CAC) 32, where voice calls are processed and a call admission signal is generated if the call is accepted. The call admission signal is sent in downstream channel 10 to the CM that is requesting a call admission. An upstream scheduler (USCM) 34 is connected to CAC 32 to control the management of voice calls. As discussed in more detail below, parameters for setting up the queues in USCH 34 are sent thereto by CAC 32 and USCH 34 acknowledges that the queues are set up. USCH 34 receives information from CSA 30 representative of the distribution of contention minislots (CMS). A block 36 monitors contention mini slots 11b on upstream channel 11 on a continuous basis to detect a collision immediately if a collision occurs. In the event of a collision, block 36 sends a contention/no contention (C/NC) signal to a block 38, which performs a collision resolution algorithm (CRA). Block 36 sends a collision message (C/NC) on downstream channel 10 to enable the CM to resend the collided request USCH 34 computes the minislots to be granted to the CM based on the requests received on upstream channel 11 and the CMS region, which are sent to a Map builder 40. The resulting MAPS generated by Map builder 40 are introduced into the MPEG transport stream of downstream channel 10 as control messages.

At CM 13, the MAP messages are recovered with the other control messages by a MPEG demultiplexer 42. The grants in the MAP messages and slot structure messages for the particular CM are separated and sent to CMSC 18 to control the allocation of data to the minislots 11a in upstream channel 11. The slot structure messages specify whether the respective slots are contention minislots or data minislots and whether the minislots are for the particular CM or another CM. The collision (C/NC) signal transmitted on downstream channel 10 and a CRA parameter derived from a control message are sent to a downstream CRA 44 for processing. Downstream CRA 44 sends the count of contention minislots to CM scheduler 18.

Figure 2A:
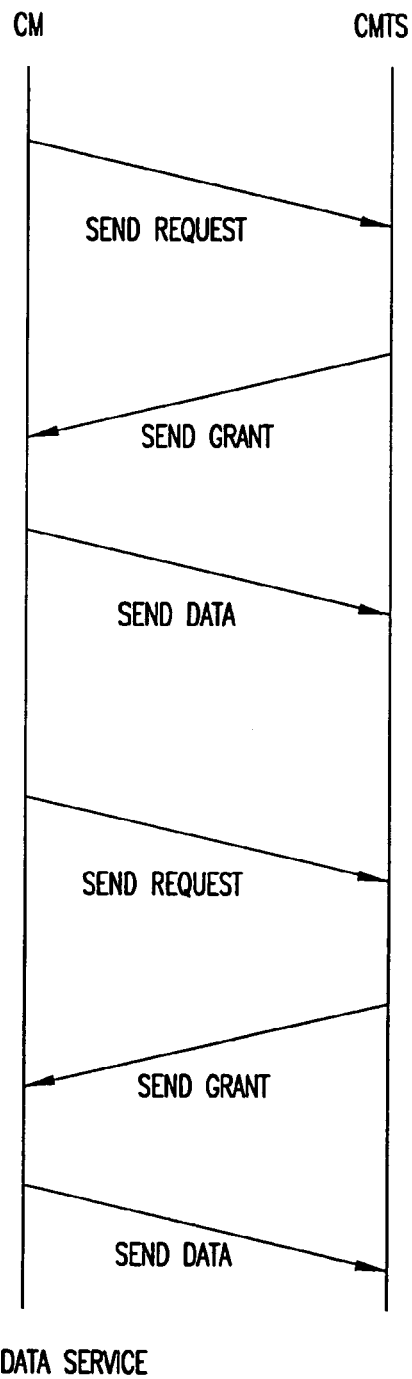
FIGS. 2A and 2B am diagrams that contrast voice service from data service.
Figure 2B:
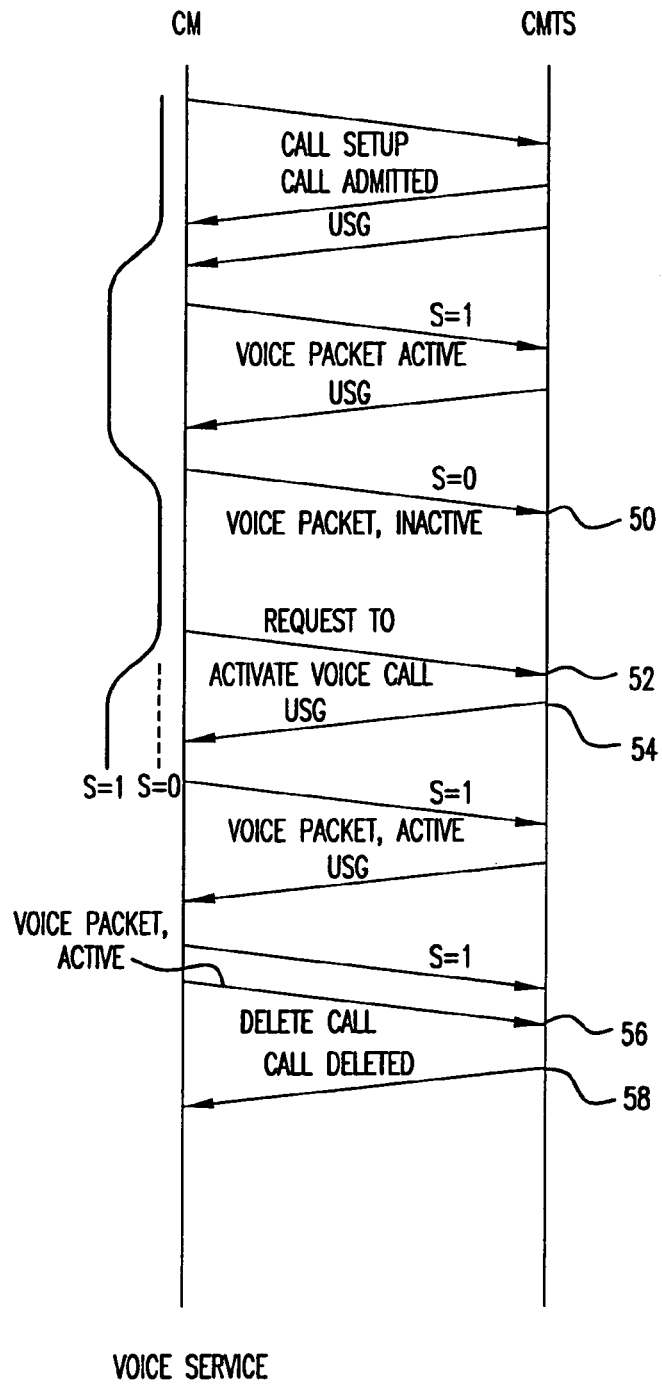

Reference is made to FIGS. 2A and 2B for a comparison between data service and voice service transmitted on a contention based, shared transmission medium such as a cable modem transmission system. Time is represented vertically and space is represented horizontally between a cable modem (CM) and a cable modem termination system (CMTS). The cable modem channel is opened according to the DOCSIS protocol. Then, as represented in FIG. 2A, data service involves a three-way handshake—the CM sends a request for bandwidth upstream in terms of minislots (MS) to the CMTS, the CMTS sends a grant of bandwidth downstream to the CM, and the CM sends data upstream to the CMTS in the granted bandwidth. This cycle is repeated by the cable modems depending on the data to be transmitted upstream. As represented by FIG. 2B, in a voice service the call is first set up by the CM, the call is then admitted by the CMTS, and unsolicited grants (USGs) are sent downstream at regular intervals from the CMTS to the CM without individual requests. Each time a USG is sent downstream, while a call is active, a voice packet is transmitted upstream in the granted bandwidth. The voice packets have a silence bit "S" that designates by its value whether the call is silent, i.e., inactive. If S=1 the call is active and if S=0, the call is inactive. The state of the silence bit is represented on the left side of FIG. 2B. During silent intervals, i.e., while a call is inactive, the CM sends a message to the CMTS that the voice call is inactive, as represented at 50 and bandwidth for that call is not granted in a USG. When an inactive call goes active again, the CM sends a message to the CMTS that the voice call is active, as represented at 52, in FIG. 2B. Then, bandwidth for that call is resumed in the USGs, as represented at 54. When a call is terminated at the CM, a delete call message is sent to the CMTS as represented at 56 and a call deleted message is sent to the CM. In practice, a number of voice calls from a CM are multiplexed and transmitted upstream to the CMTS as a unit. To conserve bandwidth the size of the grants in the USGs thus varies depending upon the number of active calls. For this purpose the value of S is transmitted upstream to the CMTS when the call activity changes. This can be done in different ways. One way is to piggyback the S value on another voice packet. Another way is to send the S value in a contention minislot (CMS). The state of the calls in process, active or silent, is maintained by queues at CMTS as described below to keep track of the size the grants as calls are admitted and deleted and as the calls go active and inactive.

Figure 3:
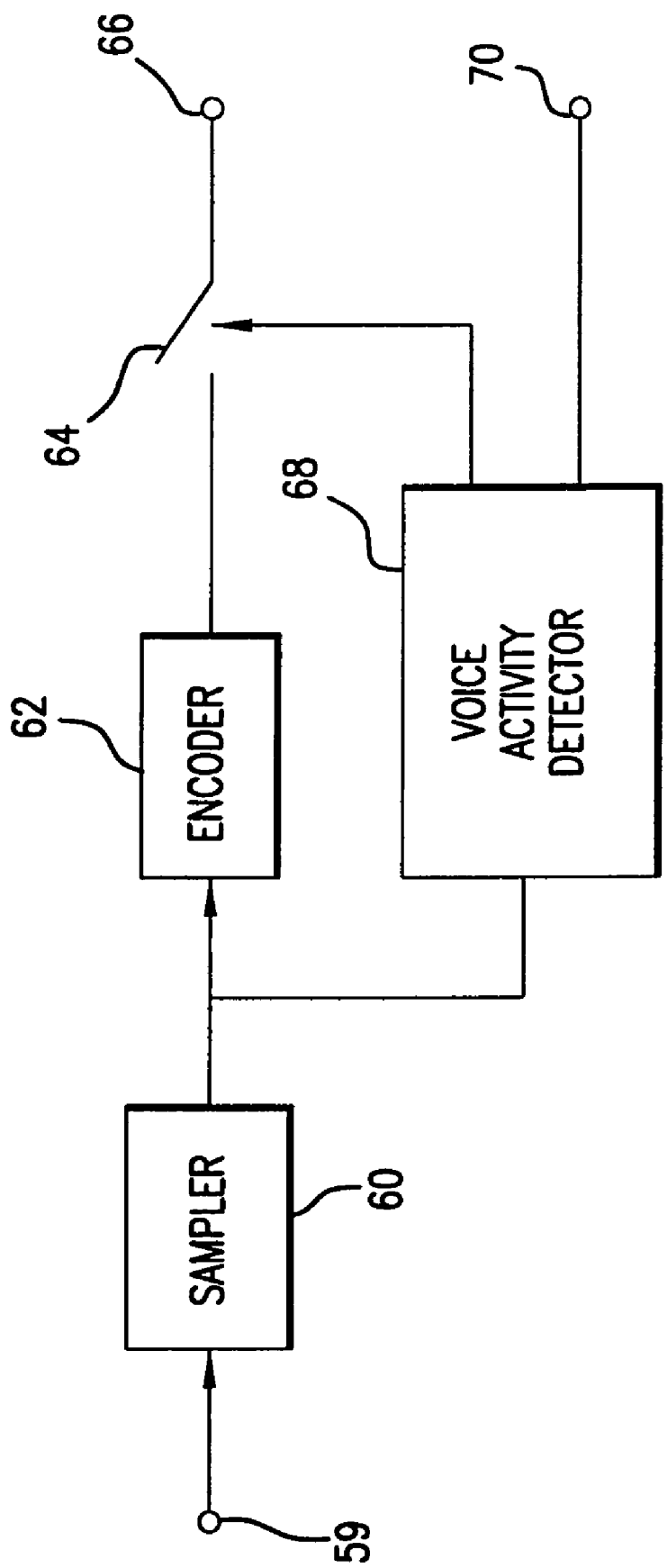
FIG. 3 is a schematic diagram of a circuit arrangement for a codec to provide an early indication of a silent state.
Figure 4A:
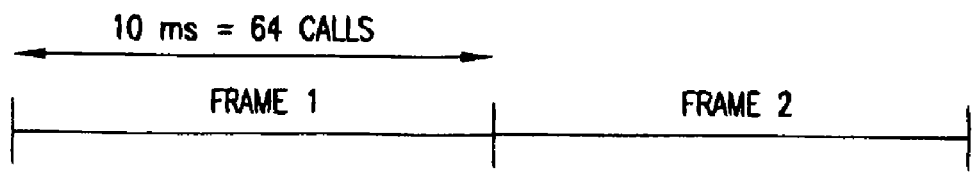
FIG. 4 is a series of diagrams that compare jitter in a conventional voice management system to one embodiment of the invention that utilizes phasing to reduce jitter.
Figure 4B:
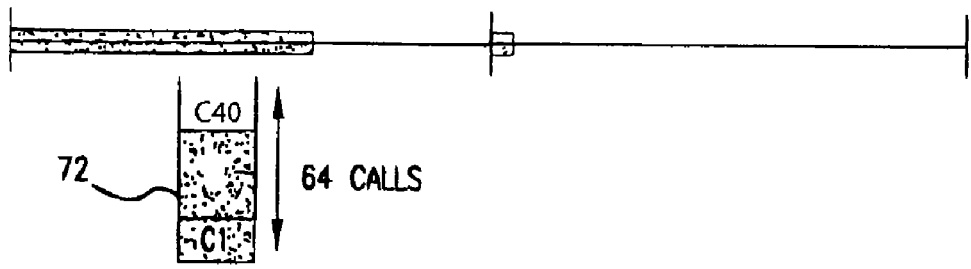
Figure 4C:
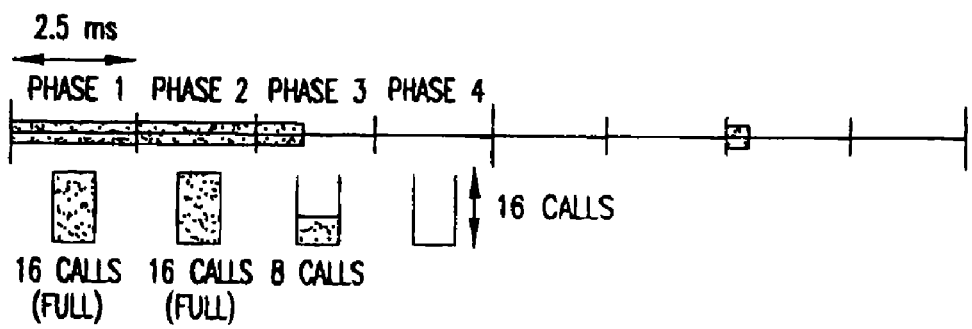
Figure 4D:

An early indication of a call going silent is desirable so the CMTS reduces the grant size without delay and to minimize jitter. A codec is incorporated into each CM to convert the voice calls to binary voice packets. (Either one codec could operate on all the calls on a time shared basis or a separate codec could be provided for each call.) In either case, as shown in FIG. 3, to obtain the early indication, an analog voice signal is coupled by an input terminal 59 to a sampler 60 that operates at a sufficently high rate to yield the desired voice quality. Sampler 60 is connected by an encoder 62 and a normally open switch 64 to an output terminal 66. The payload of the voice packet appears at output terminal 66. The early indication is given by a voice activity detector 68. There are a number of known ways to detect voice inactivity or silence, including for example determining if the average power of the voice signal is above or below a threshold value. The state of a call, active or inactive, in terms of the silence bit S, appears at a silence indicator terminal 70. When the voice signal is not above the threshold value, switch 64 is open so the payload does not appear at output terminal 66 and S=0. An early indication of voice activity is given because encoder 62 to bypassed. As stated the voice activity indications can be transmitted to the CMTS in one of number of ways.

In FIG. 4 a diagram (a) represents two consecutive upstream voice frames, Frame 1 and Frame 2, at a 10 millisecond (ms) packetization interval without any voice calls. It is assumed that the same type of codec is used to process each call; in this case the packetization interval and the grant size remain the same for all the calls. The voice frames are assumed to have a capacity of 64 calls. A diagram (b) illustrates the same two upstream frames carrying calls. A queue represented at 72 is located at the CMTS. The state of the queue represents the size of the grant of minislots that needs to be sent downstream by the USGs generated in the CMTS. The only parameter in stored queue 72 is the call IDs, which are needed to update the queue as voice calls are added and deleted and as voice calls go silent and reactivate. Frame 1 is assumed to carry 40 calls, C1-C40, having call IDs stored in queue 72. As the number of calls changes from upstream frame to frame, a search of the call IDs stored in queue 72 is conducted to identify and remove the terminating calls so the position of the remaining calls within the frame changes relative to its position in the previous frame. Assuming that calls C1 to C39 are terminated and that only call C40 remains in Frame 2 of diagram (b), i.e., a worst case condition, the position of call C40 jumps 39 call positions in Frame 2 relative to Frame 1, as illustrated in diagram (b). Extrapolating from this, the maximum jitter is equal to the packetization interval, i.e. 10 ms. In this situation the voice jitter must be buffed to compensated for jitter in the call data and this jitter tends to degrade the voice quality.

This voice jitter effect can be reduced by subdividing the upstream frames into a number of smaller phases and employing a separate queue for each phase. The jitter value can be bounded by selection of the phase size. At the time of making a call request, the SID of the cable modem can be used to specify the phase size and thus the maximum jitter value. As illustrated in a diagram (c), the 10 ms frames are subdivided into four 2.5 ms phases, namely Phases 1 to 4. Each of these phases is managed by a queue having a 16 call capacity. Assuming that the frame carries 40 calls, these calls are distributed so the queue of Phase 1 is full with 16 calls, the queue of Phase 2 is full with 16 calls, the queue of Phase 3 is half full with 8 calls, and the queue of Phase 4 is empty. Filling one queue to capacity before distributing calls to the next phase, as illustrated in diagram (c), makes it possible to use the remaining bandwidth in a fame for data transmission without unduly fragmenting the data. Calls do not cross phase boundaries when they are re-ordered. In contrast with diagram (b), if all the calls, except call C40, are terminated, for example, the location of call C40 changes by only four positions, as illustrated in a diagram (d), namely, to the edge of phase 3, instead of by 39 positions to the edge of the frame, as illustrated in diagram (b). In the worst case, a call would change by 15 positions, instead of 63 positions by virtue of the subdivision of the frames into phases, each of which is supported by a separate queue.

In the case of diagram (b), the maximum jitter that could be experienced by a call is 10 ms. In the case of diagram (d), the maximum jitter that could be experienced by a call is reduced to 2.5 ms. When a new call is requested, the maximum jitter could be specified by configuring the queues to limit the phases as illustrated.

Jitter can also be caused by silence suppression. If a voice stream is disabled by switch 64 (FIG. 3), a silence bit S in the corresponding upstream voice packet is set. Thus, the last voice packet, prior to the silent period, sends a signal in the voice packet upstream to CMTS 10. As a result, the contents of queue 72 is reduced to reflect a smaller grant size to account for the fact that the call from the cable modem has been silenced.

Figure 5A:
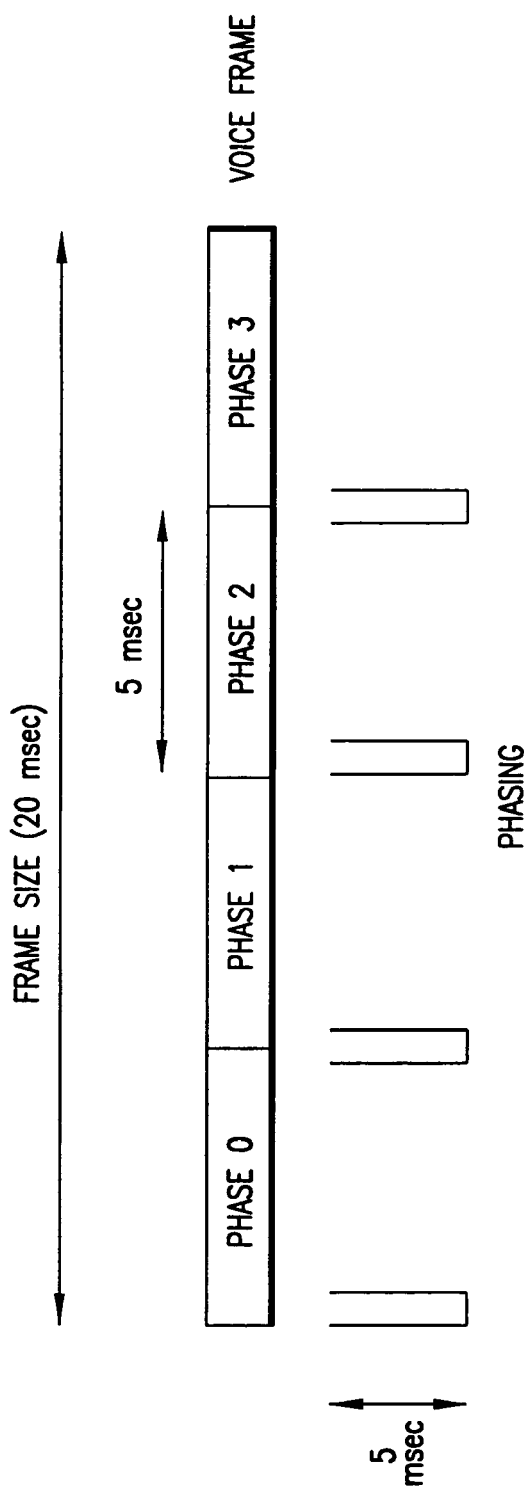
FIGS. 5A and 5B are diagrams of various phasing embodiments of the invention.
Figure 5B:
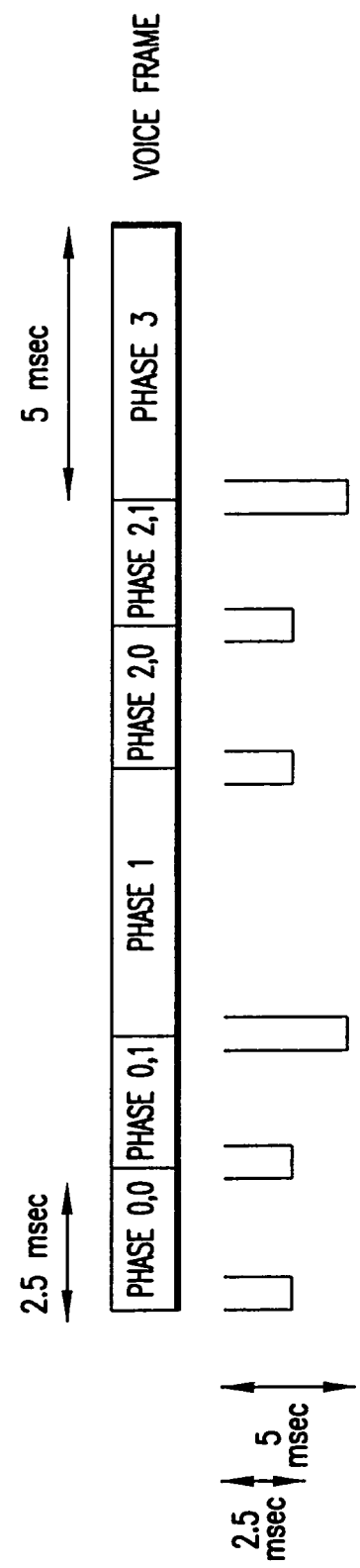

FIG. 5A illustrates phasing of Phases 0, 1, 2, and 3 at 5 ms intervals. The frame size is 20 ms. The four queues have a capacity of 5 ms. FIG. 5B illustrates subphasing wherein phases 0 and 2 are further split into two subphases each. As a result, four phases are spaced at intervals of 2.5 ms and two phases are spaced at intervals of 5 ms. The calls in four of the queues (those spaced at 2.5 ms intervals) have a lower jitter bound than the calls of the other two queues, but the tradeoff is that there is more fragmentation. This principle can be further extended to more than three levels, in each case subdividing into more phases.

FIG. 6A to 6C illustrate voice header formats. FIG. 6A illustrates a voice payload 78 encapsulated in a voice over IP packet 79 that arrives at the CM. All fields in a VoIP header are either static or increment deterministically. The static fields and the initial values of the incremental fields are known at call set-up. As a result, the CMTS can regenerate the complete voice header. A reconstruction table at the CMTS is indexed by the voice call id and the cable modem id. As a result, the VoIP headers shown in FIG. 6A are suppressed at the cable modem before transmission to the CMTS and replaced in each packet with a single byte voice header that is transmitted with the voice payload. A specific example of reconstructing the RTP header is shown here: RTP regeneration: RTP time stamps in VOIP networks help in synchronizing end-systems to the source. RTP header is a 12 bytes long. Since voice packets are generated periodically, the RTP the stamp in the nth voice packet is given by: nth Time stamp=0th Time stamp+n*Packetization interval.

Given this periodicity, this time stamp can be suppressed at the CM and generated at the CMTS, thereby eliminating the RTP header in each voice packet. This amounts to 12 bytes of savings per voice packet. In summary the VoIP headers are suppressed and replaced by a voice packet header comprising a silence bit 74 and a voice identification field 76. The voice transmission burst comprise a silence bit 74, a voice id field 76, and a voice payload 78. After transmission, the suppressed VoIP headers are expanded. The suppressed headers could be stored in a table and recovered from the table when expanded.

FIG. 6B illustrates concatenation of two voice channels at different bit rates. This reduces the size of the physical layer overhead because one physical layer header 80 is required for two voice packets 81*a* and 81*b*.

FIG. 6C illustrates concatenation of voice channels and piggybacking requests (PB 1 and PB 2) in a packet having a single header 82. The CMTS maintains the information of each call that is active. When the CMTS grants an upstream transmission to a burst, it concatenates multiple calls from the same CM into a single grant. The CMTS can demultiplex the voice calls from the Voice header. Given the fixed size of the voice packets, it can be determined how many piggybacks were added to the packet without requiring additional space to be allocated to indicate the number of piggybacks actually added to the packet.

Total number of calls: N
Number of active calls: Na
Number of calls that go silent in this grant: n $$NPB = \{\text{Burst Size} - (\text{sum of}(Na-n)\text{packets} + n^*(\text{silent packet}))\} / \{\text{Size of one } PB\}$$

The algorithm knows Na and n when it demultiplexes the voice packet.
In the example shown in the figure, N=Na=2.
NPB=(36−(21+11))/2=2 which is the correct number of piggybacks in this voice burst.

Figure 7:
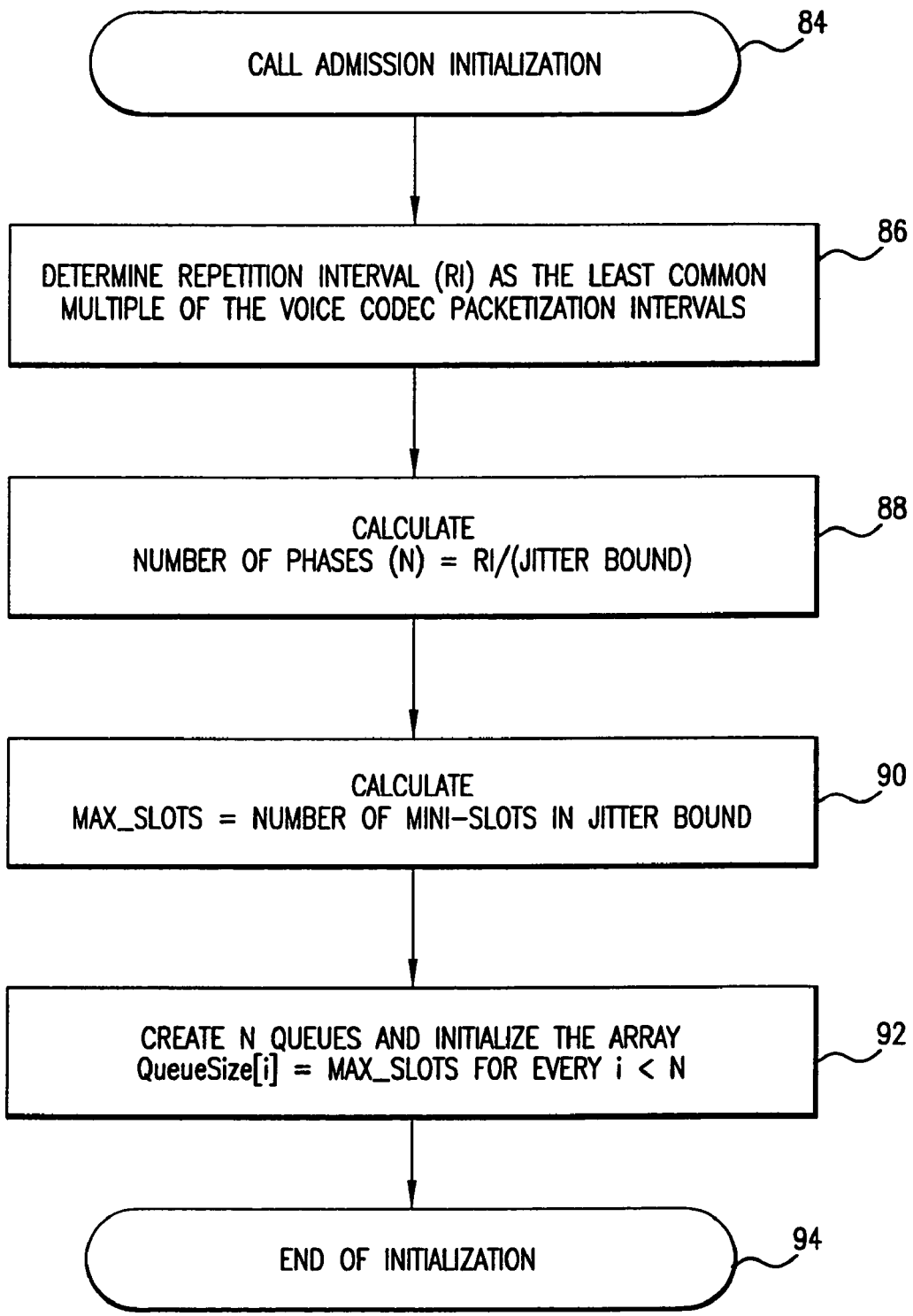
FIG. 7 is a flow diagram that shows the initialization process for call admission control.

FIG. 7 is a diagram of the initialization process for call admission control of multiple calls from multiple cable modems. As represented by a block 84 at initialization, a bit rate, a packetization interval, and a CM id are received. As represented by a block 86, the repetition interval (RI) is determined as the least common multiple of the voice condec packetization intervals. For example, if the the packetization intervals are 5 ms, 10 ms, and 20 ms, the RI is 20 ms and the jitter bound is 5 ms. As represented by a block 88, the number of phases is calculated from RI and the jitter bound, in this case, four phases. As represented by a block 90, the maximum number of slots in each queue is calculated, which is the number of minislots in the jitter bound, i.e., 16. As represented by a block 92, the queues are created and the queue size is initialized, i.e., set to 16. As resented by a block 94, the call admission initialization process is then finished.

FIGS. 9 to 12 represent queues that are filled in different ways. In each queue, the cable modem id and the call id is indicated, e.g. "2:0" is cable modem "2" and call "0".

Figure 8:
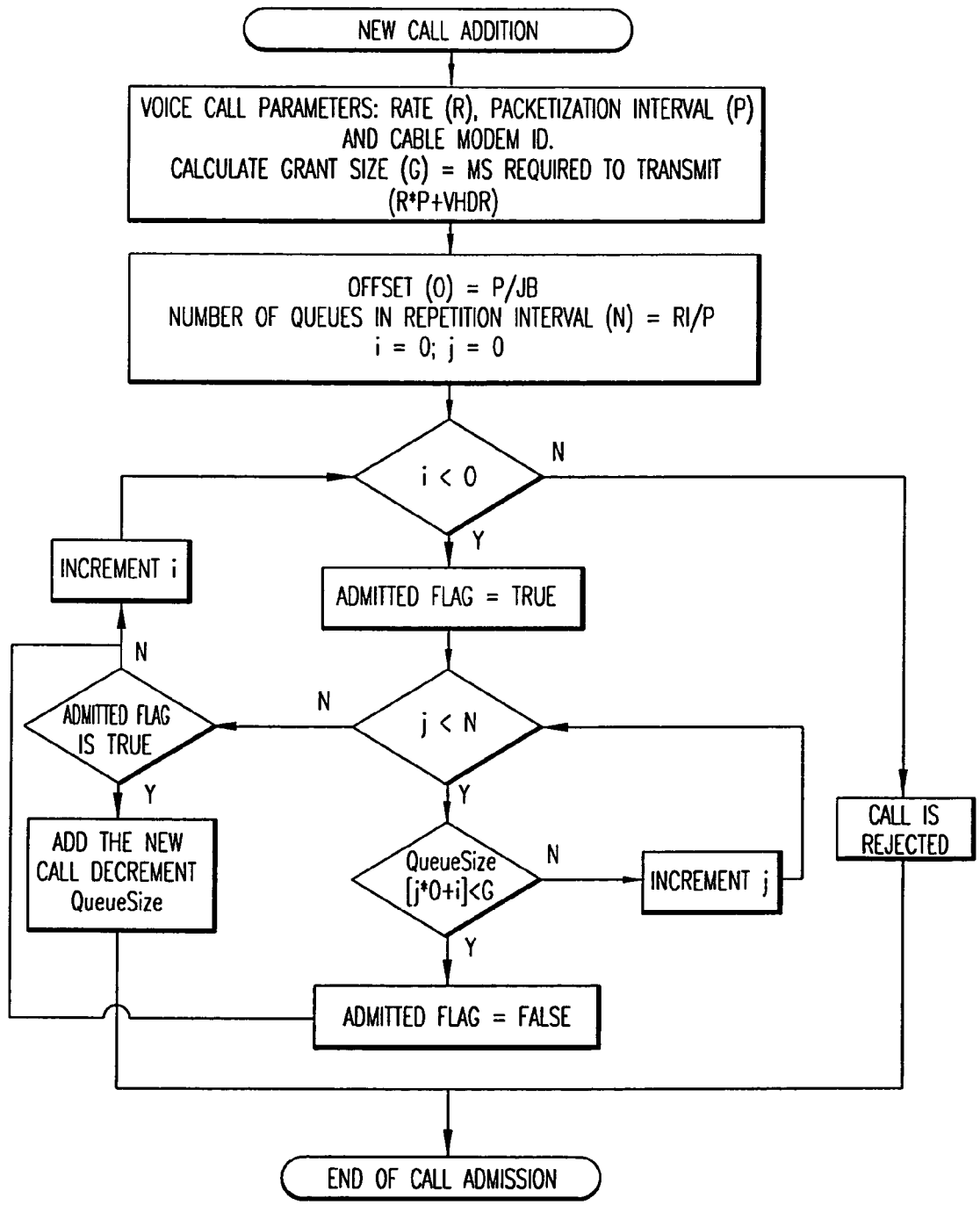
FIG. 8 is a flow diagram that shows the call admission control process.
Figure 9:
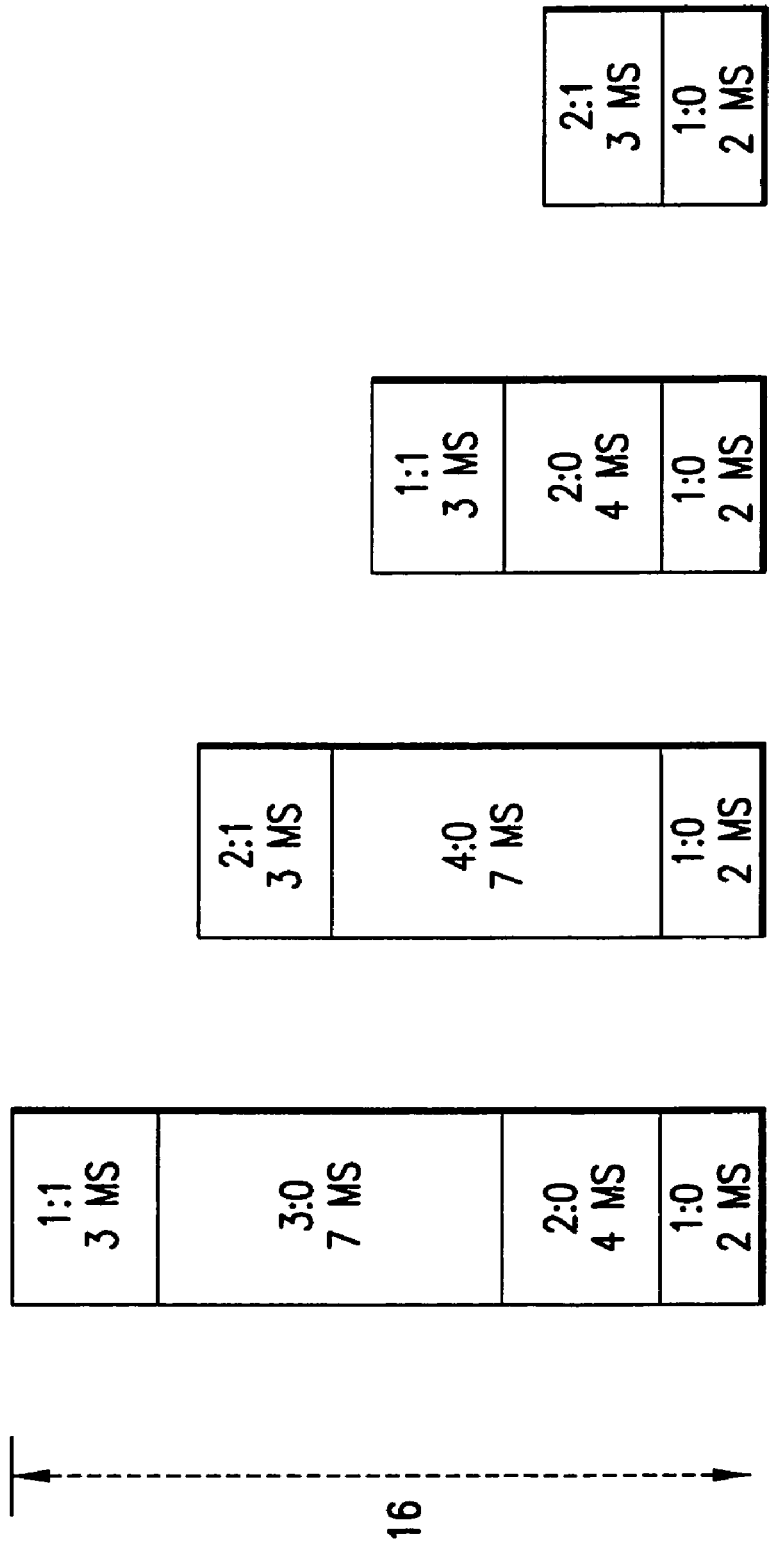

FIG. 8 is a flow diagram of the call admission control process. With referee to FIG. 9, which represents the four queues operating in an unbalanced call admission, the following table shows how the states of the four phases change pursuant to the flow diagram of FIG. 8 as the calls (see FIG. 5C) are added:

| Call No. | State of Phase 0 | State of Phase 1 | State of Phase 2 | State of Phase 3 |
|---|---|---|---|---|
| No call | 16 | 16 | 16 | 16 |
| 1 | 14 | 14 | 14 | 14 |
| 2 | 10 | 14 | 10 | 14 |
| 3 | 3 | 14 | 10 | 14 |
| 4 | 3 | 7 | 10 | 14 |
| 5 | 0 | 7 | 7 | 14 |
| 6 | 0 | 4 | 7 | 11 |

It should be noted that calls at a 5 ms interval are distributed to all the queues, calls at a 10 ms interval are distributed to every other queue, and calls at a 20 ms interval are distributed to one queue. Calls are distributed to fill the earlier phases first. Thus, in general one phase is fuller than the preceding phase, e.g., Phase 1 is fuller than Phase 2 and Phase 2 is fuller than Phase 3. As these queues are filled a counter is decremented to reflect the state of the queue.

With reference to FIG. 10, which represents the four queues operating in a balanced call admission, the following table shows how the states of the four phases change pursuant to the flow diagram of FIG. 8 as the calls (see FIG. 5C) are added:

| Call No. | State of Phase 0 | State of Phase 1 | State of Phase 2 | State of Phase 3 |
|---|---|---|---|---|
| No call | 16 | 16 | 16 | 16 |
| 1 | 14 | 14 | 14 | 14 |
| 2 | 10 | 14 | 10 | 14 |
| 3 | 10 | 7 | 10 | 14 |
| 4 | 10 | 7 | 10 | 7 |
| 5 | 7 | 7 | 7 | 7 |
| 6 | 4 | 7 | 4 | 7 |

It should be noted that the calls are distributed so the state of the queues is as balanced, i.e., as nearly the same, as possible. Referring to FIG. 10, it should be noted that queues one and three each have two calls for cable modem 1 and for cable modem 2. These calls can be concatenated and included in a single grant to reduce physical layer overhead.

Figure 12:
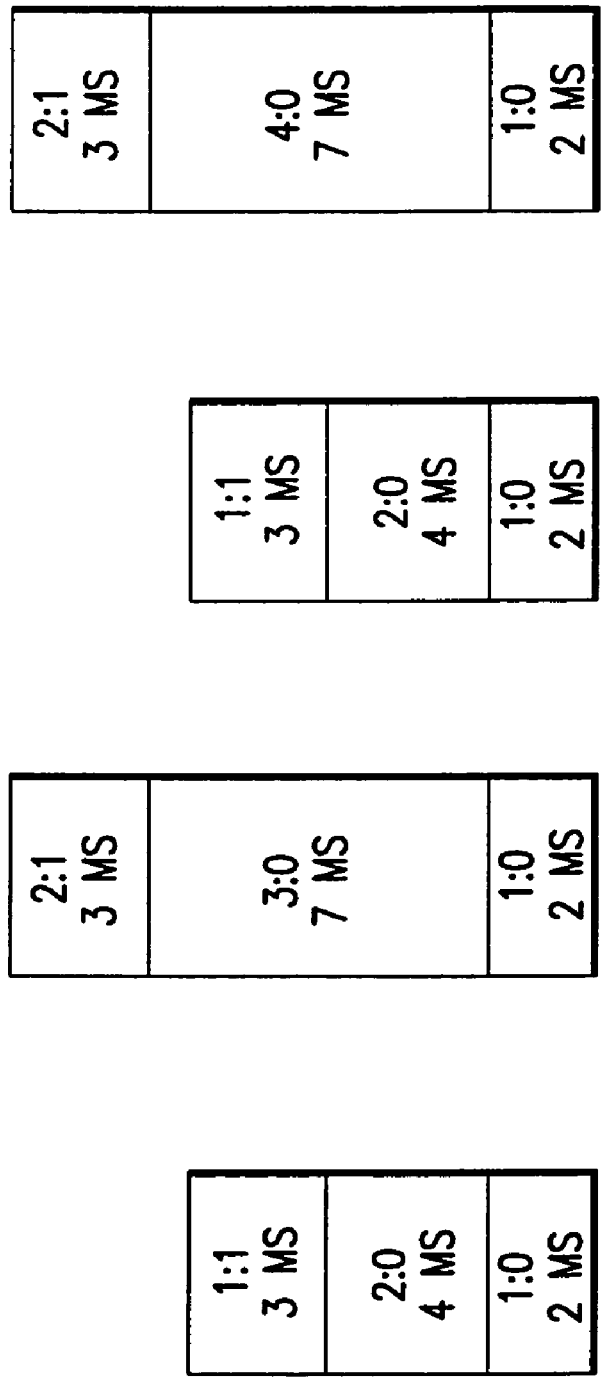

FIG. 11 shows a distribution of calls that increases the opportunities to concatenate calls. FIG. 12 shows a distribution of calls that tends to place calls from different cable modems in different queues to increase the opportunities to piggy back calls.

Figure 13:
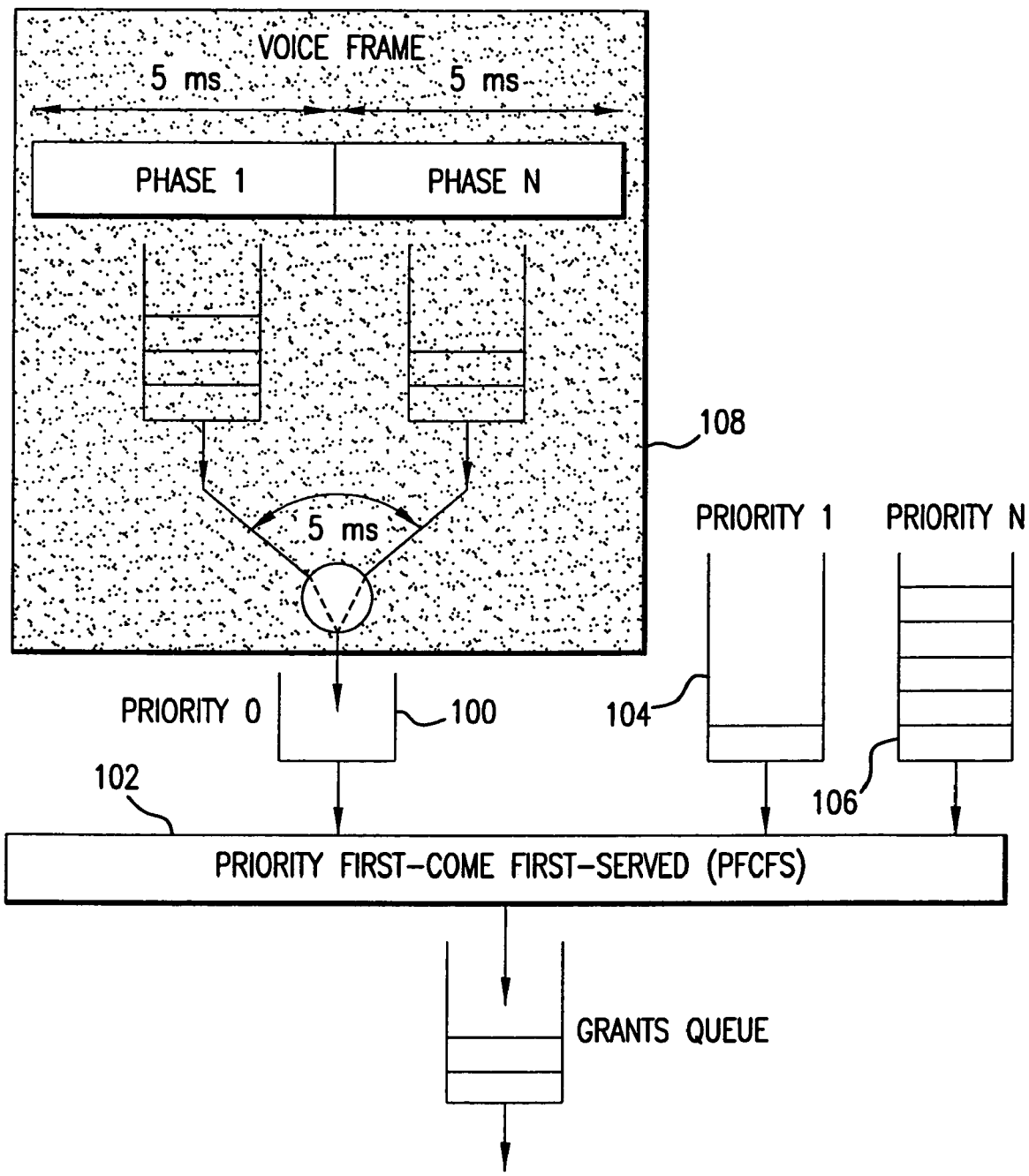
FIGS. 13 to 16 are diagrams that illustrate several embodiments of a process for mapping information in voice queues for upstream transmission.
Figure 14:
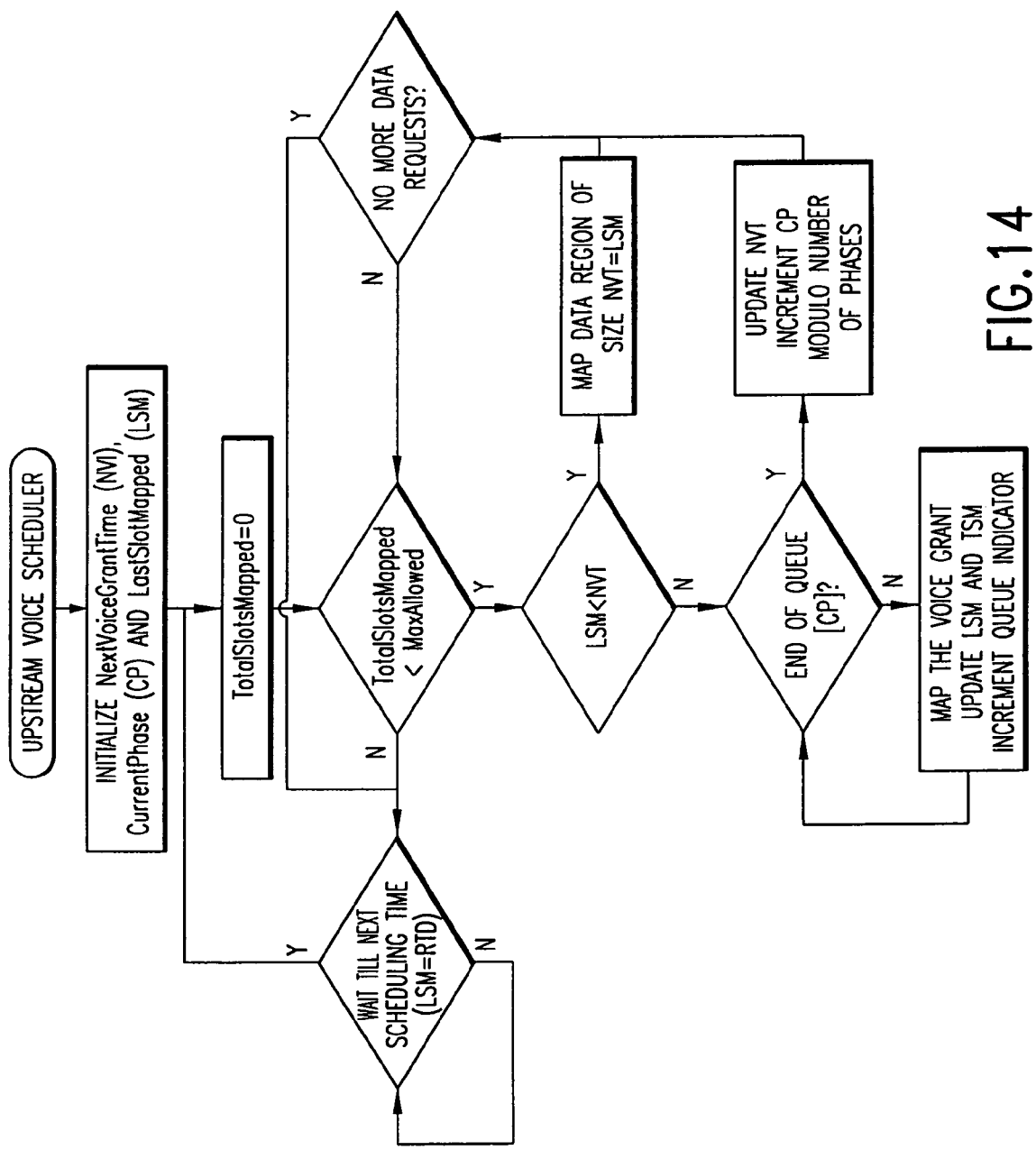
Figure 15:
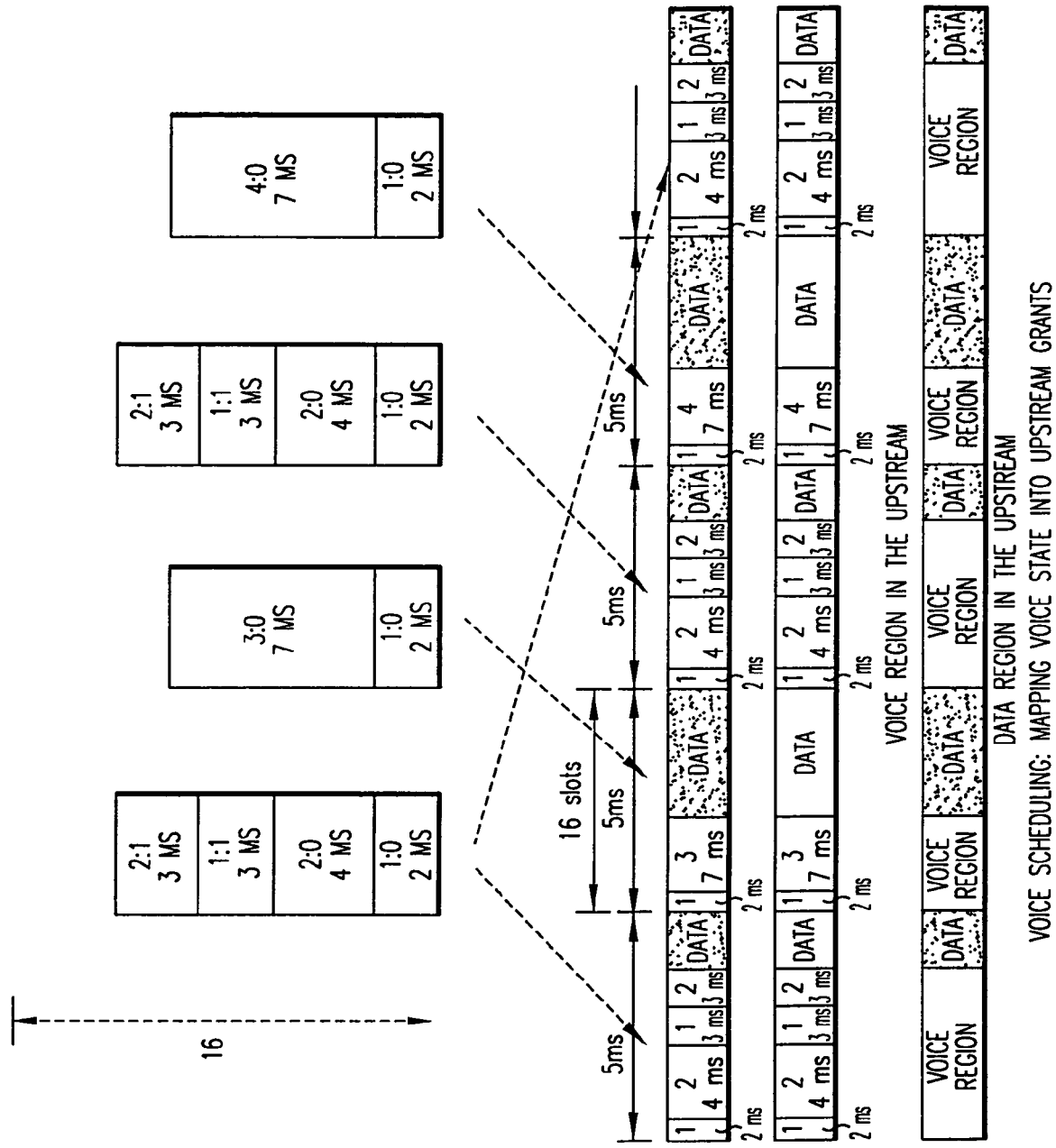
Figure 16:
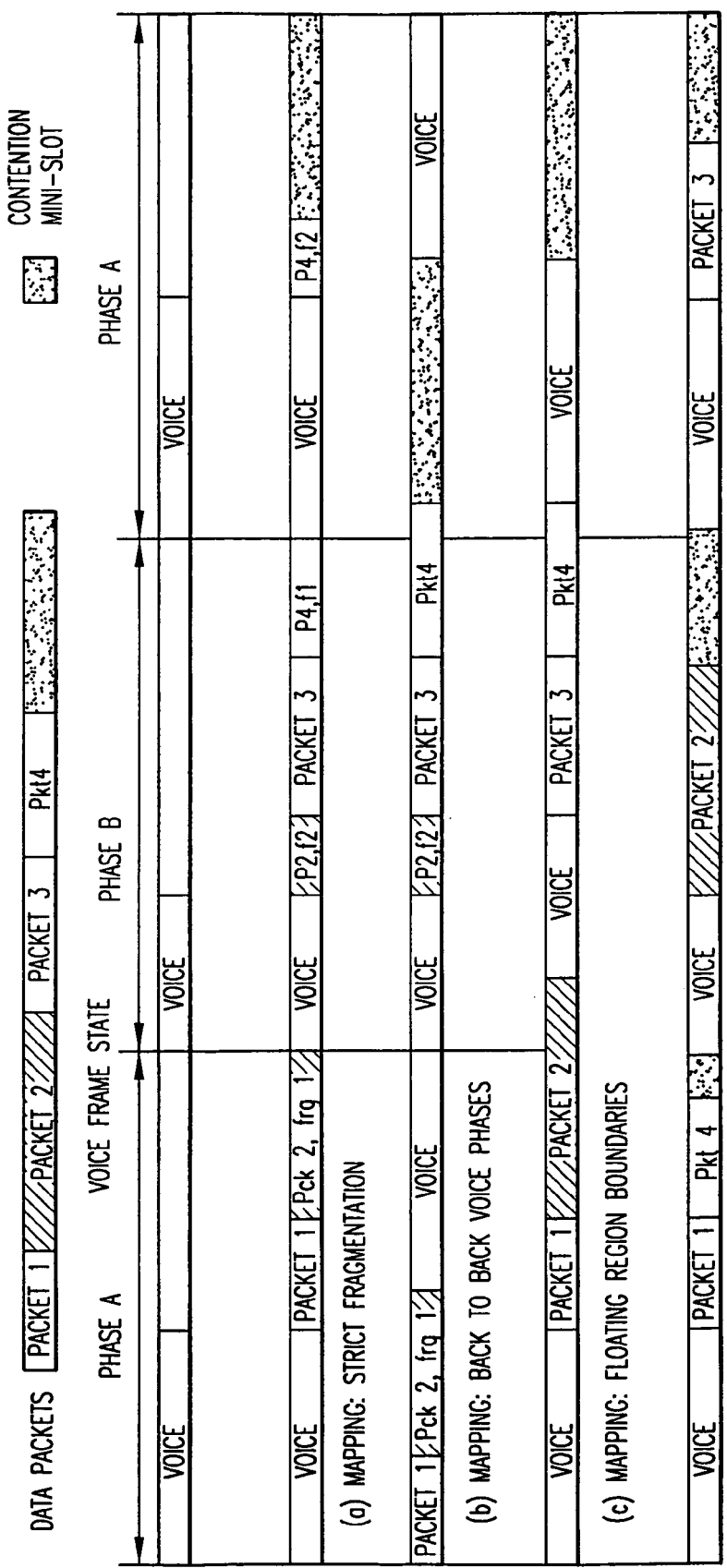
Figure 17:
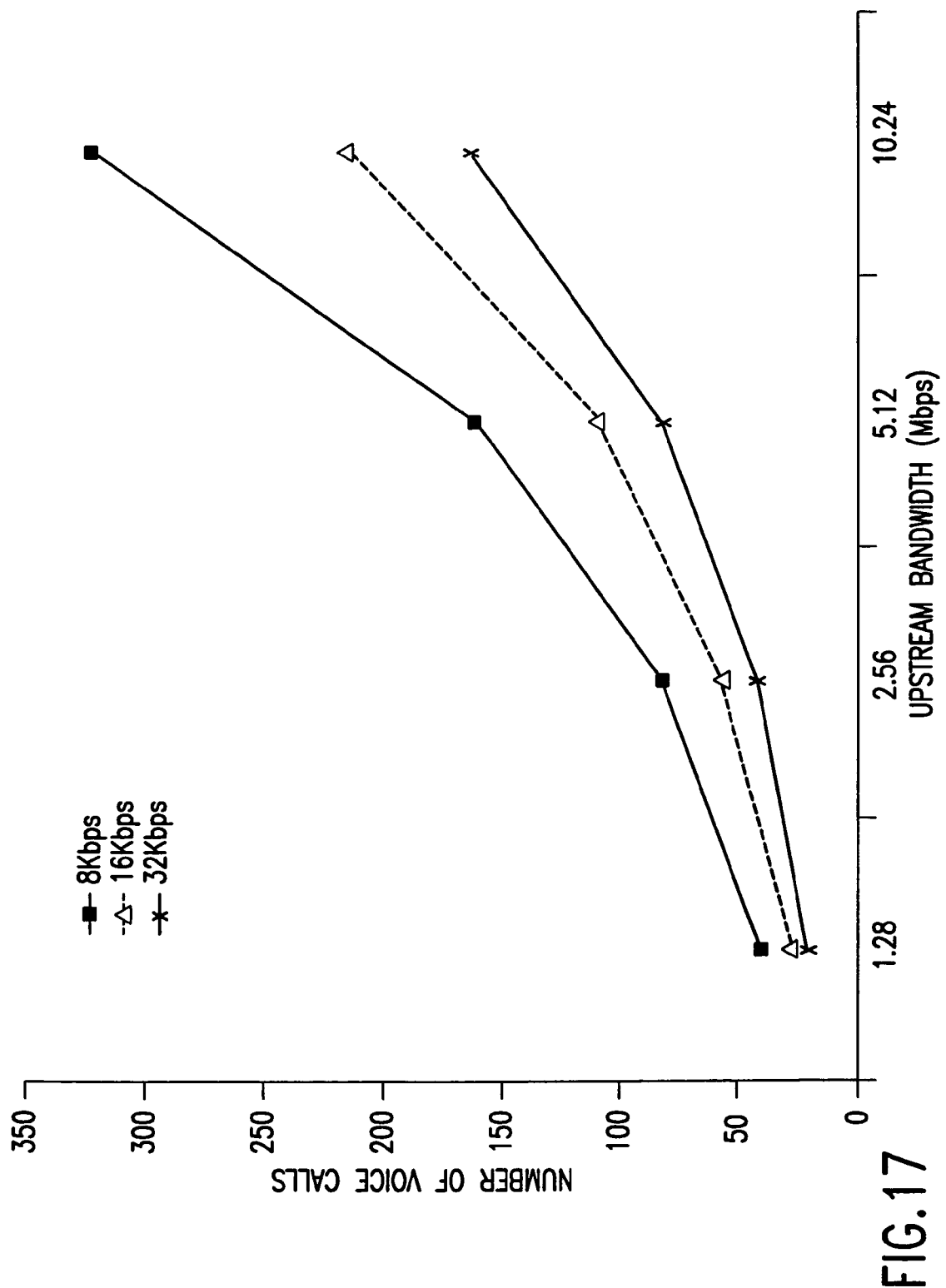
FIG. 17 is a curve representing the relationship of the number of voice calls as a function of upstream bandwidth for several sampling bit rates.
Figure 18:
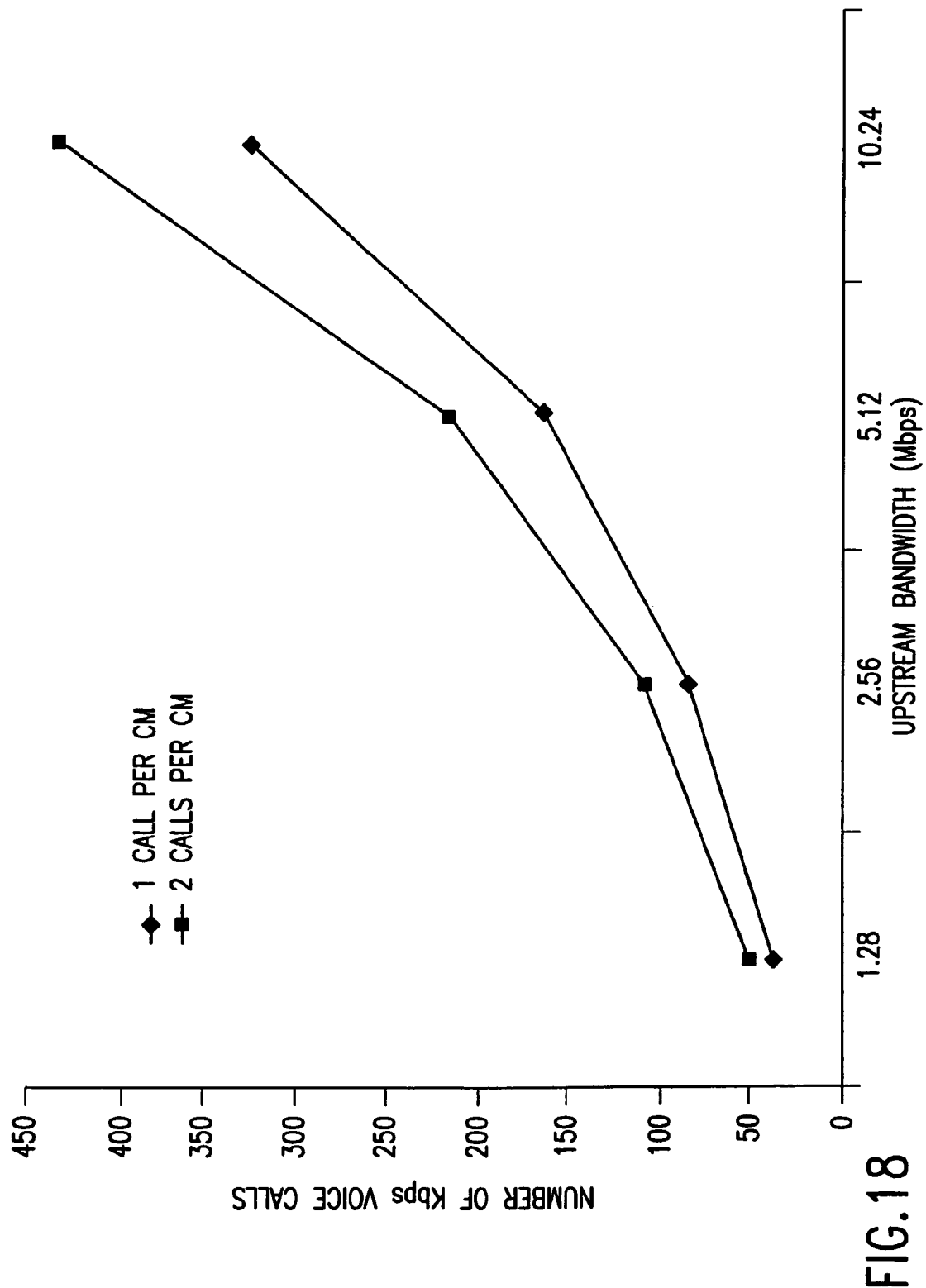
FIG. 18 is a curve representing the relationship of the number of voice calls as a function of upstream bandwidth for one call per cable modem and 2 calls per cable modem.

FIGS. 13 TO 15 illustrate how to map the information in the queues onto a MAP for upstream transmission. FIG. 13 is system level diagram of how this process is accomplished. A queue 100 with a 0 priority, i.e., highest priority, feeds voice call data to a priority first-come, first-served (PFCFS) scheduler 102. Other queues 104 and 106 having lower priorities 1 to N respectively, feed other types of data to PFCFS 102. As represented by a block 108, the phases of the voice queues are scanned at a 5 ms rate to feed the voice call data into queue 100.

Figure 19:
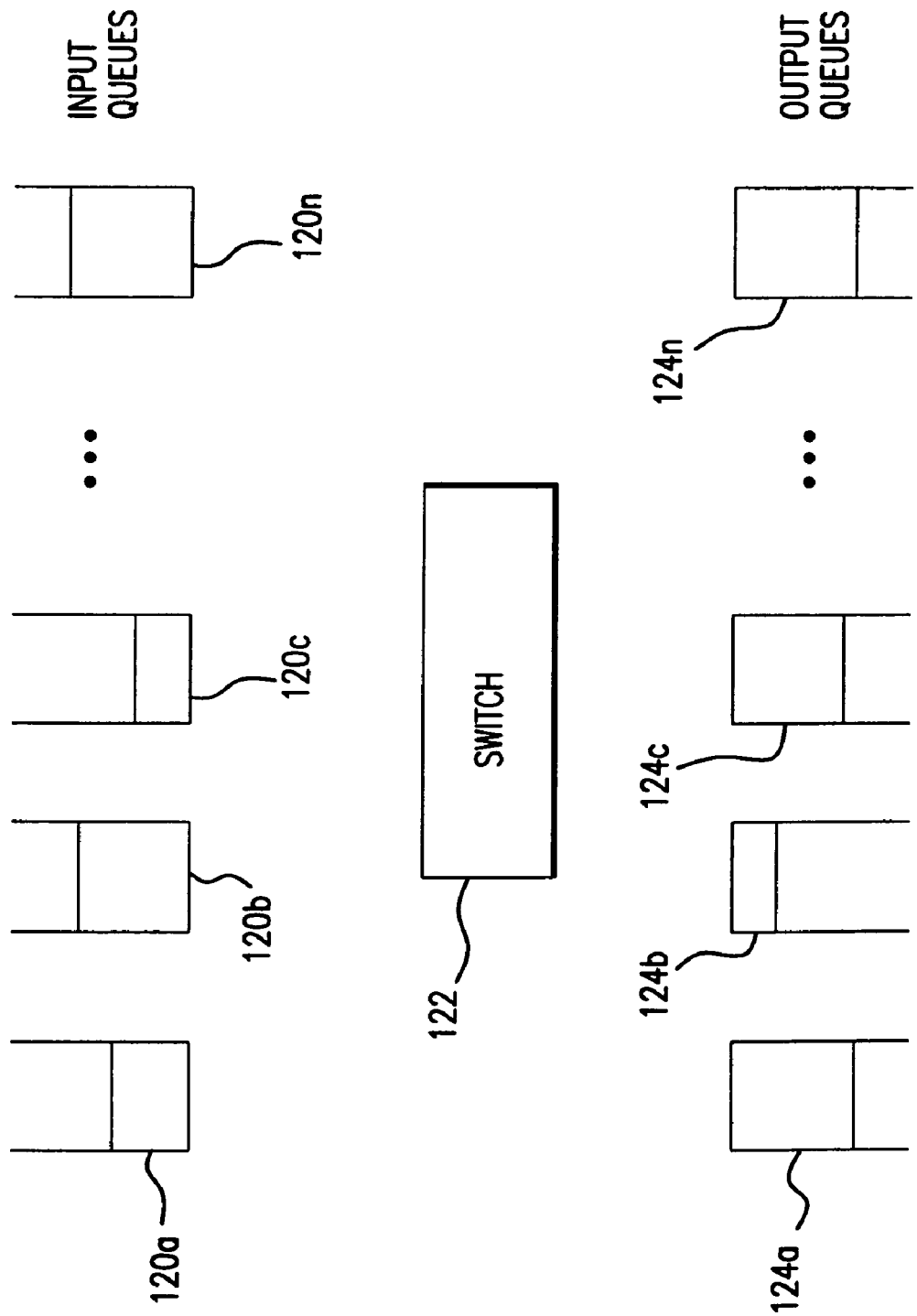
FIG. 19 is a diagram broadly representing the applicability of the invention.

The described invention could be implemented in software or hardware. A software implementation may be somewhat easier to design and cheaper to build in small quantities. Although a hardware implementation may be more difficult to design, it may operate faster and the cost becomes less significant in large quantities. The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. In general, as illustrate in FIG. 19 the invention is applicable to a communication system in which data stored in a plurality of input queues 120a, 120b, 120c, . . . , 120n represents data packets that are selectively transmitted by a switch 122 such as a wide area network to a plurality of output queues 124a, 124b, 124c, . . . , 124n This data could be data to be transmitted externally of the system or other data such as scheduling data. In any case, the packetization interval could be divided into phases and the phases could be stored in a queue assigned to each phase. When viewed from the point of view of one of the output queues, the invention is applicable to a shared multi-point to point transmission system such as for example fixed wireless, fiber, or satellite.

This application claims priority to the following provisional applications:

U.S. Pat. Ser. No. 60/182,470, entitled "intelligent Silence Suppression," filed Feb. 15, 2000, by Gummalla et al., (still pending) (incorporated by reference in its entirety herein).

U.S. Pat. Ser. No. 60/247,188 (Attorney Docket No. CPH 40892 (BP 1560), entitled "A Local Scheduling Mechanism for Cable Modems," filed Nov. 9, 2000, by Sala et al., (still pending) (incorporated by reference in its entirety herein).

U.S. Pat. Ser. No. 60/254,415 (Attorney Docket No. CPH40892 (BP 1560.1), entitled "A Local Scheduling Mechanism for Cable Modems," filed Dec. 8, 2000, by Sala et al., (still pending) (incorporated by reference in its entirety herein).

U.S. Pat. Ser. No. 60/262,201 (Attorney Docket No. CPH 41359 (BP 1702), entitled "Voice Scheduling Algorithms," filed Jan. 17, 2001, by Sala et al., (still pending) (incorporated by reference in its entirety herein), U.S. Pat. Ser. No. 60/262,203 (Attorney Docket No. CPH 41362 (BP 1705), entitled "Concatenation of Requests at CMTS," filed Jan. 17, 2001, by Sala et al., (still pending) (incorporated by reference in its entirety herein).

This application claims priority to the following non-provisional application:

U.S. Pat. Ser. No. 09/427,792, entitled "System and Method for Multiplexing Data from Multiple Sources," fled Oct. 27, 1999, by Limb et al., (still pending) (incorporated by reference in its entirety herein).

This application is related to the following non-provisional applications, all having the same filing date as the present application:

"Method, System and Computer Program Product for Scheduling Upstream ,Communications", U.S. patent application Ser. No. 09/783,404, by Gummalla et al. (incorporated by reference in its entirety herein).

"System and Method for Suppressing Silence in Voice Traffic over an Asynchronous Communication Medium," U.S. patent application Ser. No. 09/783,405 by Gummalla et al., (incorporated by reference in its entirety herein).

"System and Method for Combining Requests for Data Bandwidth by a Data Provider for Transmission of Data Over an Asynchronous Communication Medium," U.S. patent application Ser. No. 09/783,311 by Gummalla et al., (incorporated by reference in its entirety herein).

"Cable Modem System and Method for Specialized Data Transfer," U.S. patent application Ser. No. 09/783,403 by Bunn et al., (incorporated by reference in its entirety herein).

What is claimed is:

1. A method for scheduling a plurality of voice calls comprising:
    (a) creating a plurality of queues, each queue corresponding to a phase, comprising:
        (1) receiving parameters for a plurality of potential voice calls, each potential voice call having parameters of a bit rate and a packetization interval;
        (2) determining a repetition interval corresponding to the least common multiple of the packetization intervals;
        (3) determining a number of phases, wherein the number of phases is equal to the repetition interval divided by a jitter bound;
        (4) determining a maximum number of slots corresponding to the number of minislots in the jitter bound; and
        (5) creating a queue corresponding to each phase, wherein each queue has the maximum number of slots; and
    (b) distributing the plurality of voice calls among the plurality of queues.

2. The method of claim 1, wherein step (b) comprises distributing voice calls evenly among the plurality of queues.

3. The method of claim 1, wherein step (b) further comprises:
    (1) identifying a plurality of voice calls associated with a network bridge; and
    (2) concatenating at least two of the identified voice calls.

4. The method of claim 3, wherein the network bridge is a cable modem.

5. The method of claim 1, further comprising:
    (c) removing a terminated voice call from a queue.

6. The method of claim 1, further comprising:
    (c) identifying a silent voice call in a queue and deactivating the silent voice call.

7. The method of claim 6, further comprising:
    (c) identifying a non-silent deactivated voice call in a queue and reactivating the non-silent deactivated voice call.

8. A system for scheduling a plurality of voice calls comprising:
    creating means for creating a plurality of queues, each queue corresponding to a phase, comprising:
        receiving means for receiving parameters for a plurality of potential voice calls, each potential voice call having parameters of a bit rate and a packetization interval;
        means for determining a repetition interval corresponding to the least common multiple of the packetization intervals;
        means for determining a number of phases equal to the repetition interval divided by a jitter bound;
        means for determining a maximum number of slots equal to the number of minislots in the jitter bound; and
        queue creating means for creating the plurality of queues,
            wherein each queue corresponds to a phase, and
            wherein each queue has the maximum number of slots; and
    distributing means for distributing the plurality of voice calls among the plurality of queues.

9. The system of claim 8, wherein the distributing means distributes the plurality of voice calls in a balanced fashion among the plurality of queues.

10. The system of claim 8, wherein the distributing means further comprises:
    means for identifying a plurality of voice calls in a queue of the plurality of queues associated with a network bridge; and
    means for concatenating at least two of the identified voice calls.

11. The system of claim 10, wherein the network bridge is a cable modem.

12. The system of claim 8, further comprising:
    means for removing a terminated voice call from a queue of the plurality of queues.

13. The system of claim 8, further comprising:
    means for identifying a silent voice call in a queue and deactivating the silent voice call.

14. The system of claim 13, further comprising:
    means for identifying a non-silent deactivated voice call in a queue and reactivating the non-silent deactivated voice call.

* * * * *